United States Patent
Sato (10) Patent No.: US 6,775,115 B2
(45) Date of Patent: Aug. 10, 2004

(54) VOLTAGE CONVERSION SYSTEM AND METHOD AND RECORDING MEDIUM

(75) Inventor: Eiji Sato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/318,226

(22) Filed: Dec. 13, 2002

(65) Prior Publication Data

US 2003/0117823 A1 Jun. 26, 2003

(30) Foreign Application Priority Data

Dec. 20, 2001 (JP) ........................................ 2001-387500

(51) Int. Cl.⁷ ................................................. H02H 5/04
(52) U.S. Cl. ........................................ 361/23; 307/10.7
(58) Field of Search ................................ 307/10.7, 134, 307/125, 10.1; 361/18, 23; 363/56.02; 318/139, 141, 767; 180/2.1

(56) References Cited

U.S. PATENT DOCUMENTS 5,412,293 A * 5/1995 Minezawa et al. .......... 318/376
5,818,708 A * 10/1998 Wong .......................... 363/89

FOREIGN PATENT DOCUMENTS

| JP | A 8-214592 | 8/1996 |
| JP | A 10-66383 | 3/1998 |
| JP | A 2001-275367 | 10/2001 |

* cited by examiner

*Primary Examiner*—Shawn Riley
(74) *Attorney, Agent, or Firm*—Oliff & Berridge, PLC (57) ABSTRACT

A battery voltage is increased in a converter and is input to an inverter that supplies a motor with a motor drive current. A control unit detects input and output voltages of the converter from outputs of voltage sensors and controls the switching in the converter in accordance with the detected input and output voltages. When one of the sensors fails, the control unit estimates the voltage that would have otherwise been detected by the failed voltage sensor based on the switching state in the converter and the voltage detected by the other voltage sensor.

12 Claims, 6 Drawing Sheets

VOLTAGE CONVERSION SYSTEM AND METHOD AND RECORDING MEDIUM

INCORPORATION BY REFERENCE

The disclosure of Japanese Patent Application No. 2001-387500 filed on Dec. 20, 2001 including the specification, drawings and abstract is incorporated herein by reference in its entirety.

BACKGROUND OF THE INVENTION

1. Field of Invention

The invention relates to a voltage conversion system which converts voltage using a converter, a voltage conversion method thereof, and a recording medium that stores a program for implementing the voltage conversion method.

2. Description of Related Art

An inverter has generally been used for driving an alternating current (AC) motor such as a permanent magnet motor. More specifically, direct current supplied from a battery is converted into a desired form of alternating current by means of an inverter and thereafter is applied to a motor to drive it. Especially, in an electric motor vehicle or a hybrid motor vehicle, it is necessary to finely control the output of the motor, therefore such a system using an inverter is preferably used.

In a case that a motor is driven by use of a system including an inverter as described above, however, when an input voltage of the inverter is low, it may cause an undesirable state where current necessarily becomes high to achieve a high output of the motor. In view of this, there is a demand for maintaining the input voltage of the inverter sufficiently high. On the other hand, a battery is basically constituted of battery cells each having output voltage of approximately 1V. For obtaining a high battery voltage, therefore, it is necessary to connect many battery cells in series. To avoid this, it is demanded, on the contrary to the above demand, that the battery voltage is made as low as possible.

In view of the above situation, it has been proposed to increase a battery voltage by means of a boost converter and thereafter input it to an inverter. With this arrangement, it is possible to set a high inverter input voltage even if the available battery voltage is low.

Figure 6:
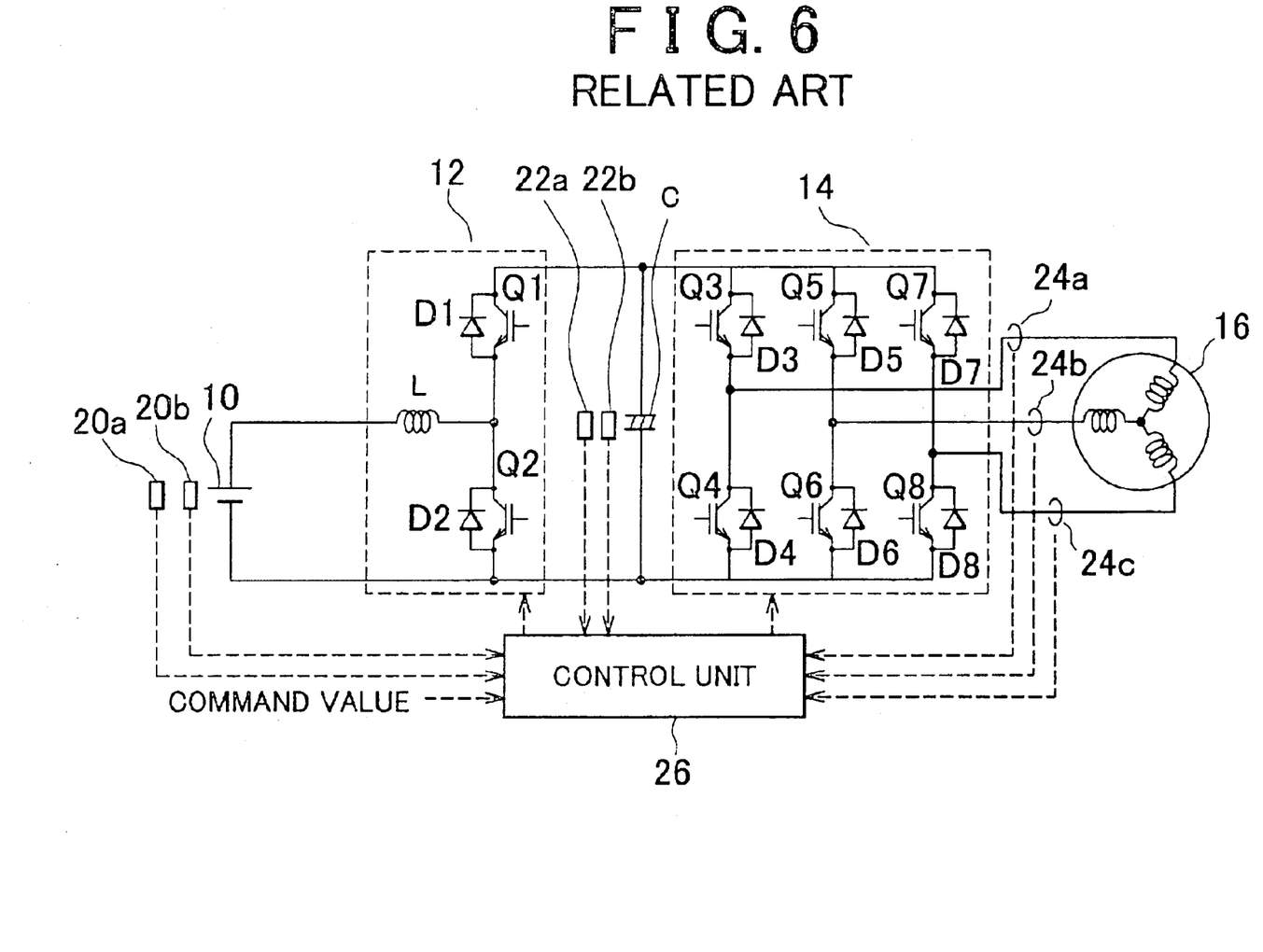
FIG. 6 is a schematic view showing an overall construction of one conventional voltage conversion system.

FIG. 6 shows one example of such a conventional motor drive circuit including a converter. A positive terminal of a battery 10 is connected to a converter 12 that includes a coil L and transistors Q1, Q2. One end of the coil L is connected to the positive terminal of the battery 10. An emitter of the transistor Q1 is connected to the other end of the coil L while a collector thereof is connected to a positive output line of the converter 12 (a positive bus bar of an inverter), and a collector of the transistor Q2 is connected to the same end of the coil L and the emitter of the transistor Q1 while an emitter thereof is connected to a negative terminal of the battery 10 (a negative output line of the converter 12 connected to a negative bus-bar of the inverter). Further, diodes D1, D2 are respectively connected between the emitter and the collector of the transistors Q1, Q2, so as to allow the current to flow therethrough only in one direction from the emitter side to the collector side.

The transistors Q1, Q2 are switched on/off alternately to change an "ON" time ratio therebetween as needed for achieving a desired high output voltage of the converter 12.

Besides, a smoothing capacitor C is arranged between the positive and negative output lines of the converter 12 so as to smooth the output of the converter 12.

The positive and negative outputs of the converter 12 smoothed by the capacitor C are respectively input to the positive and negative bus bars of the inverter 14. The inverter 14 includes six transistors Q3 to Q8 and is adapted to produce three different phase outputs. More specifically, the transistors Q3 and Q4, the transistors Q5 and Q6, and the transistors Q7 and Q8 are respectively connected to each other in series between the positive and negative bas bars, thus forming three phase arms. Each connecting point between the transistor located in the upper side of each phase arm, namely the transistor Q3, Q5, or Q7, and that located in the lower side thereof, namely the transistor Q4, Q6, or Q8, provides each phase output of the inverter 14. Also, diodes D3 to D8 are respectively connected between the emitter and the collector of the transistors Q3 to Q8 so as to allow the current to flow therethrough only in one direction from the emitter side to the collector side.

Each of the three phase outputs of the inverter 14 is connected to one end of a corresponding one of phase coils of a three-phase AC motor 16 (hereinafter will be simply referred to as "motor 16").

With the motor drive circuit constructed as described above, when driving the motor 16, necessary one or ones of the transistors Q3 to Q8 are switched on such that the transistors in the upper side of the respective phase arms and the transistors in the lower side thereof are not ON at the same time, thus applying three phase currents shifted by 120° from one another to the motor 16.

In this circuit, there also provided voltage sensors 20a, 20b, 22a and 22b, and current sensors 24a, 24b and 24c. The voltage sensors 20a, 20c are both used for detecting the voltage of the battery 10 (battery voltage: converter input voltage) while the voltage sensors 22a, 22b are both used for detecting the voltage of the capacitor C (converter output voltage: inverter input voltage). The current sensors 24a, 24b, and 24c are used for detecting the respective phase currents applied to the motor 16. The detected values of these sensors and command values for controlling the motor output are input to the control unit 26. In accordance with these values, the control unit 26 switches on/off the transistor Q1 in the upper side of the converter 12 and the transistor Q2 in the lower side thereof so as to obtain a desired output voltage of the converter 12, while switching on/off the transistors Q3 to Q8 of the inverter 14 so as to bring the output of the motor 16 to a motor output command value.

The operations of the converter 12 and the inverter 14 are both controlled using a so-called PWM (Pulse Wave Modulation) control. More specifically, a desired voltage command value is set with respect to a predetermined triangular carrier (wave), and the duty ratio between the transistors Q1, Q2 is adjusted to control the voltage conversion (i.e. voltage increase rate or voltage decrease rate).

On the other hand, when controlling the output of the motor 16, the transistors Q3 to Q8 of the inverter 14 are switched on/off according to a result of a comparison between a voltage command value for the phase outputs and the predetermined triangular carrier (wave), so as to achieve the voltage command value.

In the motor drive circuit shown in FIG. 6, as described above, there also provided two voltage sensors 20a, 20b for detecting the voltage of the battery 10 and another two voltage sensors 22a, 22b for detecting the voltage of the capacitor C. This is because it is necessary to detect the input and output voltages of the converter 12 and to detect the input voltage of the inverter 14 for controlling their operations. With the two voltage sensors (20a and 20b, or 22a and 22b) provided in each location, further, the voltage can be reliably detected even in the event of a failure of each voltage sensor.

More specifically, having two voltage sensors in each location as above makes it possible to detect the voltage even when one of the sensors fails, and thus provides the fail-safety of the system. However, such arrangement involves a problem that the overall cost of the system becomes high since four sensors are needed. Also, such arrangement may further cause the following problems. That is, the converter 12 becomes uncontrollable when the voltage sensors 20a, 20b for detecting the voltage of the battery 10 both fail, and the converter 12 and the inverter 14 both become uncontrollable when the voltage sensors 22a, 22b for detecting the voltage of the capacitor C both fail.

SUMMARY OF THE INVENTION

In view of the above problems, the present invention has been made to provide a voltage conversion system which includes a reduced number of voltage sensors and is capable of performing a failsafe operation in the event of a failure of each sensor, a voltage conversion method thereof, and a recording medium storing a program for implementing the voltage conversion method.

A voltage conversion system according to a first embodiment of the invention includes a converter that converts voltage, a converter control portion serving to variably control widths of the voltage to be converted in the converter, an input voltage sensor that detects an input voltage of the converter, an output voltage sensor that detects an output voltage thereof, and a control unit adapted to determine the presence of an abnormality of the input or output voltage sensor on the basis of the controlling state in which widths of the voltage to be converted is controlled by the converter control portion.

According to the first embodiment of the invention, a failure of the input or output voltage sensor is detected on the basis of the controlled state of widths of the voltage to be converted in the converter, such as the switching state (duty ratio) of the switching elements constituting the converter. Thus, the detection of a failure of each voltage sensor can be effected without providing two voltage sensors in each location, namely without providing two voltage sensors for detecting the input voltage of the converter and another two voltage sensors for detecting the output voltage thereof.

Also, when a failure of one of the input and output voltage sensors is determined, the control unit may estimate the voltage that would have otherwise been detected by the failed voltage sensor on the basis of the controlled state of widths of the voltage to be converted and the output from the other voltage sensor operating normally.

A voltage conversion system according to a second embodiment of the invention includes a converter that converts voltage, a voltage detection device that detects input or output voltage of the converter, a converter control portion that variably controls widths of the voltage to be converted in the converter, and an estimation portion that estimates one of the input and output voltages of the converter that has not been detected by the voltage detection device on the basis of the controlling state in which widths of the voltage to be converted is controlled by the converter control portion.

According to the second embodiment of the invention, when one of the input and output voltage sensors fails, the voltage that would have otherwise been detected by the failed voltage sensor is estimated on the basis of the controlled state of widths of the voltage to be converted in the converter (i.e. the duty ratio in the converter) and the voltage detected by the other voltage sensor operating normally. Thus, even if one of the input and output voltages is not detected, the control is continued by estimating the undetected voltage.

According to a voltage conversion method of a third embodiment of the invention, a system includes a converter which converts voltage and is controlled to variably change widths of the voltage to be converted, an input voltage sensor for detecting an input voltage of the converter, and an output voltage sensor for detecting output voltage thereof, the system being adapted to determine the presence of an abnormality of the input or output voltage sensor on the basis of the controlled state of widths of the voltage to be converted in the converter.

According to the third embodiment of the invention, a failure of the input or output voltage sensor is detected on the basis of the controlled state of widths of the voltage to be converted in the converter, such as the switching state of the switching elements constituting the converter (i.e. the duty ratio in the converter). Thus, the detection of a failure of each voltage sensor can be effected without providing two voltage sensors in each location, namely without providing two voltage sensors for detecting the input voltage of the converter and another two voltage sensors for detecting the output voltage thereof.

According to a voltage conversion method of a fourth embodiment of the invention, a system includes a converter which converts voltage and is controlled to variably change widths of the voltage to be converted, and a voltage detection device for detecting the input or output voltage of the converter, the system being adapted to estimate one of the input and output voltages of the converter that has not been detected by the voltage detection device on the basis of (1) the controlled state of widths of the voltage to be converted in the converter and (2) the other of the input and output voltages that has been detected by the voltage detection device.

According to a fourth embodiment of the invention, when one of the input and output voltage sensors fails, the voltage that would have otherwise been detected by the failed voltage sensor is estimated on the basis of the controlled state of widths of the voltage to be converted in the converter (i.e. the duty ratio in the converter) and the voltage detected by the other voltage sensor operating normally. Accordingly, even if one of the input and output voltages is not detected, the control is continued by estimating the undetected voltage.

Meanwhile, it is to be understood that the invention is not limited to the first to fourth embodiments described above. To the contrary, the invention also covers in its scope a recording medium storing a program for implementing the voltage conversion method according to the third or fourth embodiment.

BRIEF DESCRIPTION OF THE DRAWINGS

The above mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

The preferred embodiments of the invention will hereinafter be described with reference to FIGS. 1 to 6.

Figure 1:
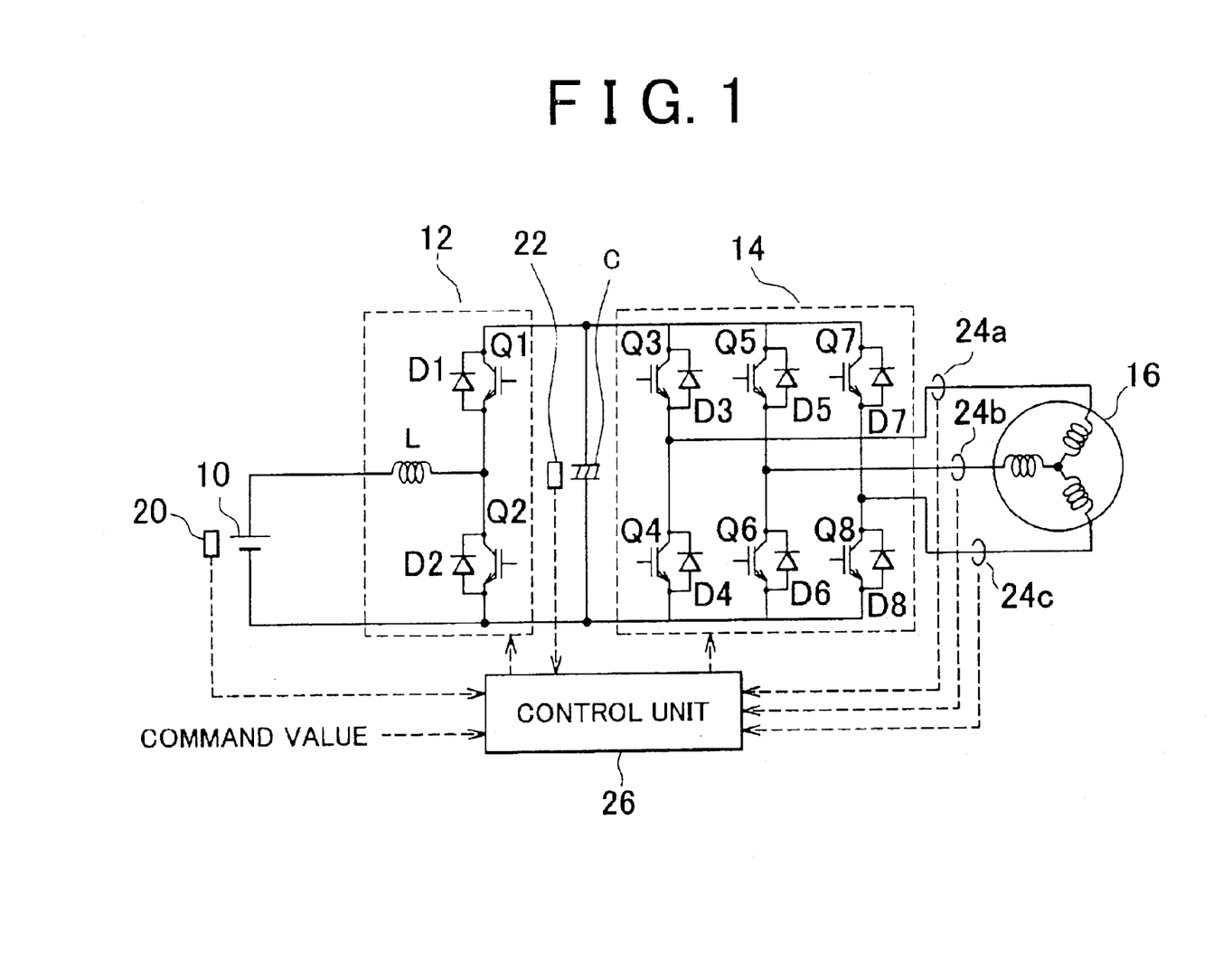
FIG. 1 is a schematic view showing an overall construction of a voltage conversion system according to one embodiment of the invention.

FIG. 1 is a view showing construction of a first embodiment of the invention. As shown in FIG. 1, a positive terminal of a battery 10 is connected to a converter 12. A capacitor C is connected between positive and negative output lines of the converter 12, which lines being respectively connected to positive and negative bus bars of an inverter 14. One end of each phase coil of a motor 16 is connected to a corresponding one of phase outputs of the inverter 14. The converter 12 includes a coil L, transistors Q1, Q2 and diodes D1, D2, while the inverter 14 includes transistors Q3 to Q8 and diodes D3 to D8. Also, there provided current sensors 24a, 24b and 24c for measuring currents of the respective phase outputs supplied from the inverter 14 to the motor 16, a voltage sensor 20 serving as an input voltage sensor for detecting the voltage of the battery 10 (battery voltage: converter input voltage) and another voltage sensor 22 serving as an output voltage sensor for detecting the voltage of the capacitor C (converter output voltage: inverter input voltage). A control unit 26 is adapted to perform the switching control of the converter 12, as e.g. a converter control portion, and the inverter 14 on the basis of the detected values of the voltage sensors 20, 22 and the current sensors 24a to 24c and a motor output command value which has been input to the control unit 26.

Figure 2:
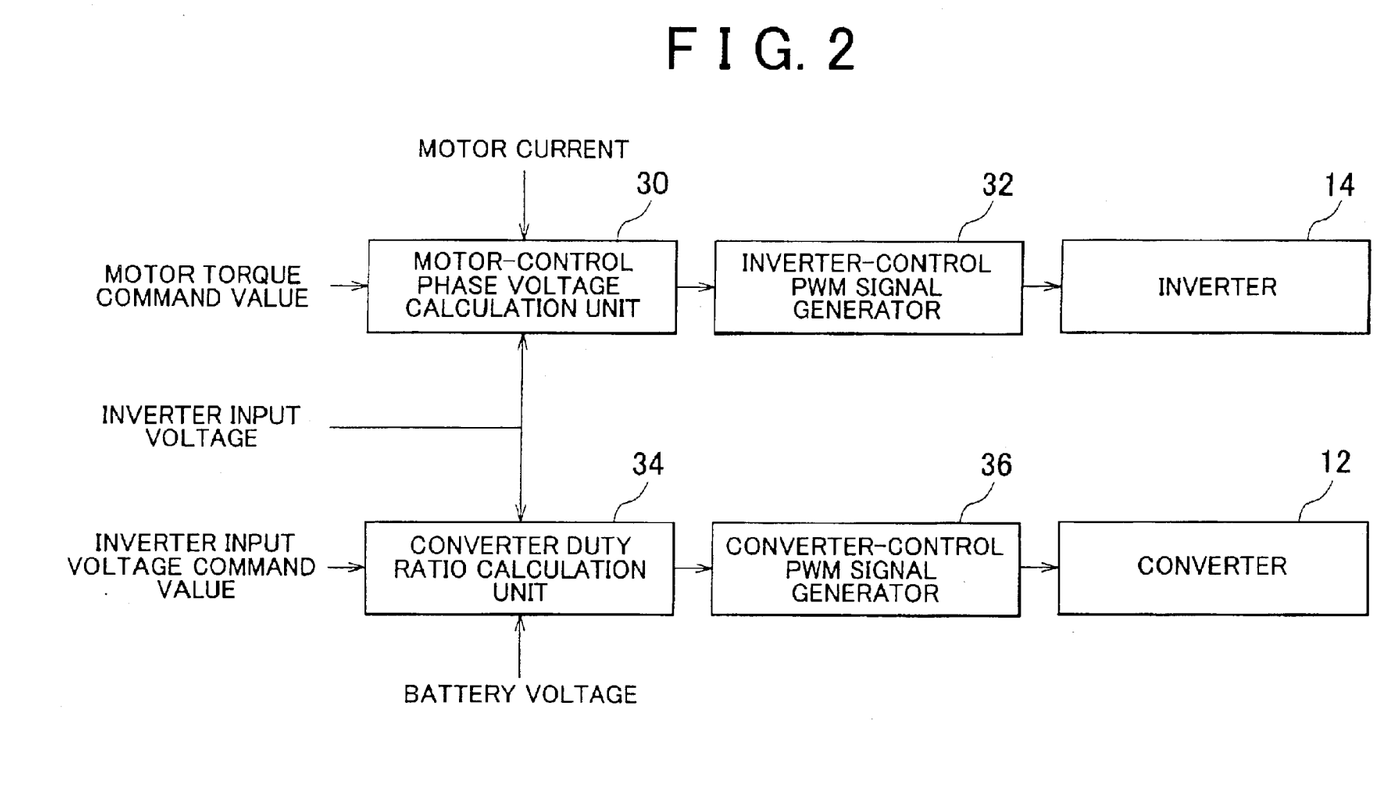
FIG. 2 is a schematic view showing an internal configuration of a control unit.

FIG. 2 shows the configuration of the control unit 26. As shown in FIG. 2, the motor output command value is input to a motor-control phase voltage calculation unit 30. The calculation unit 30 receives signals indicative of the currents of the respective phase outputs supplied to the motor 16 detected by the current sensors 24a, 24b, and 24c and a signal indicative of the input voltage of the inverter detected by the voltage sensor 22. Using these informations, the calculation unit 30 calculates a phase voltage for controlling the motor output, namely, determines a voltage command signal indicating the voltage to be applied to the end of each phase coil of the motor 16 so as to bring the output torque of the motor 16 to the motor output command value.

Subsequently, the voltage command value calculated by the motor-control phase voltage calculation unit 30 is supplied to an inverter-control PWM signal generator 32. The inverter-control PWM signal generator 32 is adapted to receive the predetermined triangular wave as a carrier signal and generate a PWM signal in accordance with a result of a comparison between the triangular wave and the voltage command value for the phase outputs. The generated PWM signal is supplied to a base of the respective transistors of the inverter 14 to control the current of each phase output to the motor 16. Needless to say, a known waveform of various kinds (e.g., a sign wave) may be used as a carrier signal instead of a triangular wave.

On the other hand, signals indicative of the battery voltage detected by the voltage sensor 20 and the inverter input voltage detected by the voltage sensor 22 are input to a duty ratio calculation unit 34. The duty ratio calculation unit 34 also receives an inverter input voltage command value. This command value is generally a constant value, but it is preferable to increase the value as the motor output torque increases. The duty ratio calculation unit 34 is adapted to determine a voltage command value indicative of the voltage to be achieved at the connecting point of the transistors Q1, Q2 and supply the determined voltage command value to a converter-control PWM signal generator 36. The converter-control PWM signal generator 36 determines on-duty time of each transistor Q1 or Q2 in accordance with a comparison between the voltage command value and the triangular wave, and outputs a corresponding PWM signal for controlling the transistors Q1, Q2. Thus, the converter 12 is controlled by switching on/off the transistors Q1, Q2 according to the PWM signal, so as to raise the voltage to the target level.

Thus, the control unit 26 controls the output torque of the motor 16 so as to achieve the command value while controlling the inverter input voltage to its target value continuously.

In addition, the control unit 26 in the embodiment also functions to detect an abnormality such as a failure of each voltage sensor 20 or 22 and estimate the voltage which would have otherwise been detected by the failed voltage sensor in the event of a failure of each sensor, as described in detail in the following.

Figure 3:
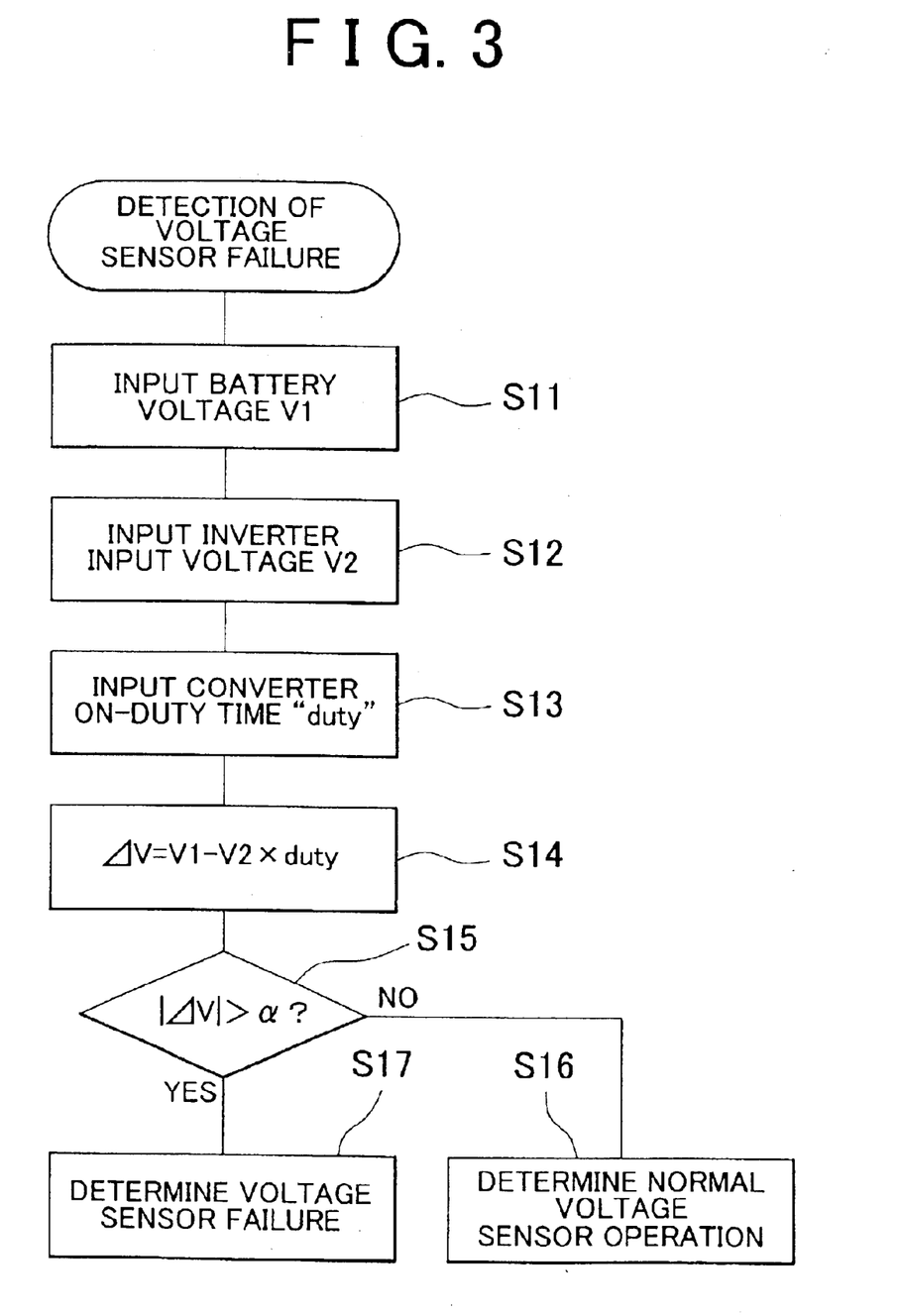
FIG. 3 is a flowchart showing processes to be implemented for detecting an failure of a voltage sensor.

First, the detection of a failure of each voltage sensor will be described with reference to FIG. 3. The control unit 26 first reads battery voltage V1 detected by the voltage sensor 20 (step S11) and inverter input voltage V2 detected by the voltage sensor 22 (step S12). Subsequently, the control unit 26 reads a variable "duty" indicative of the on-duty time of the transistor Q1 located in the upper side of the converter 12, which value has been determined in the control unit 26 (step S13). The control unit 26 then calculates "$\Delta V = V1 - V2 \times duty$" (step S14). Here, "$V2 \times duty$" surely represents the average voltage at the connecting point of the transistors Q1, Q2 and corresponds to the voltage V1 of the battery 10. Thus, "$\Delta V$" that represents the difference between these values is basically a small value.

Next, it is determined whether "$\Delta V$" representing the voltage difference is larger than a predetermined threshold $\alpha$ (step S15). If "NO" is given in the determination of step S15, it is determined that the voltage sensors are both operating normally (step S16). If "YES" is given in the determination, conversely, a failure of the voltage sensor is determined (step S17).

According to the embodiment, as described above, an abnormality of each voltage sensor 20 or 22 is effectively detected by determining whether the values detected by the respective voltage sensors 20, 22 conform to the state of the voltage conversion being performed in the converter 12.

In the meantime, the failed voltage sensor is not specified in the above determination processes. It is however possible to determine a failure of the voltage sensor 20 detecting the battery voltage, when the battery voltage which, basically, does not largely change is significantly different from the standard value. Also, it is possible to estimate the inverter input voltage from the detected values of the current sensors 24a to 24c and the operating state of the inverter 14. Accordingly, it is preferable to determine which voltage sensor fails by estimating the battery voltage and the inverter input voltage based on such other informations. Furthermore, by integrating these informations, an abnormality of the converter 12 and the inverter 14 can also be detected.

Figure 4:
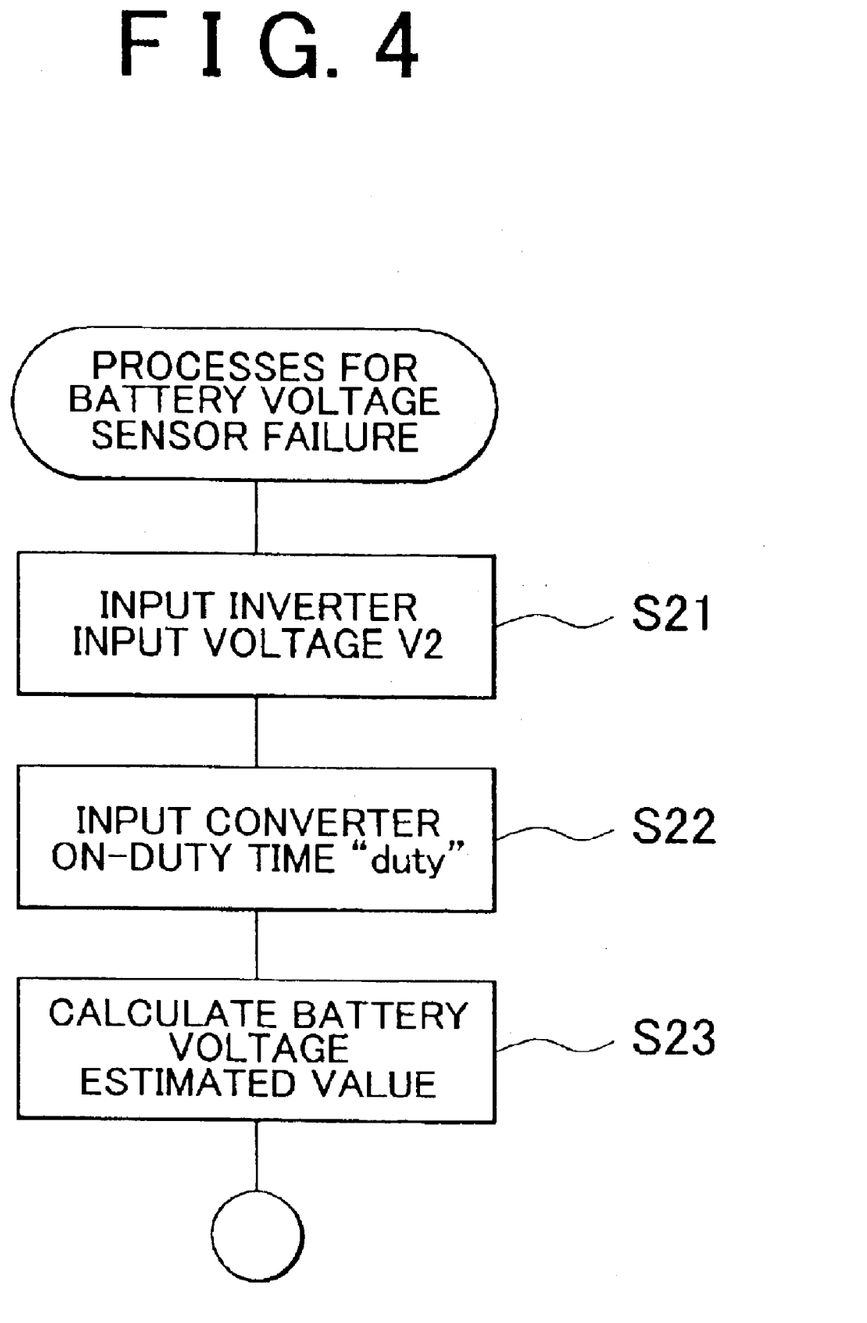
FIG. 4 is a flowchart showing processes to be implemented in the event of a failure of a battery voltage sensor.

Hereinafter, processes to be implemented in the event of a failure of the battery voltage sensor 20 will be described with reference to FIG. 4. First, the control unit 26 reads the inverter input voltage V2 (step S21), and reads the duty ratio "duty" in the converter 12 (step S22). Subsequently, the control unit 26 obtains battery voltage estimated value V1' by calculating "V1'=V2×duty" (step S23). By using the obtained estimated value V1', the control unit 26 performs the switching control of the converter 12 so as to maintain the inverter input voltage V2 to a predetermined value.

Figure 5:
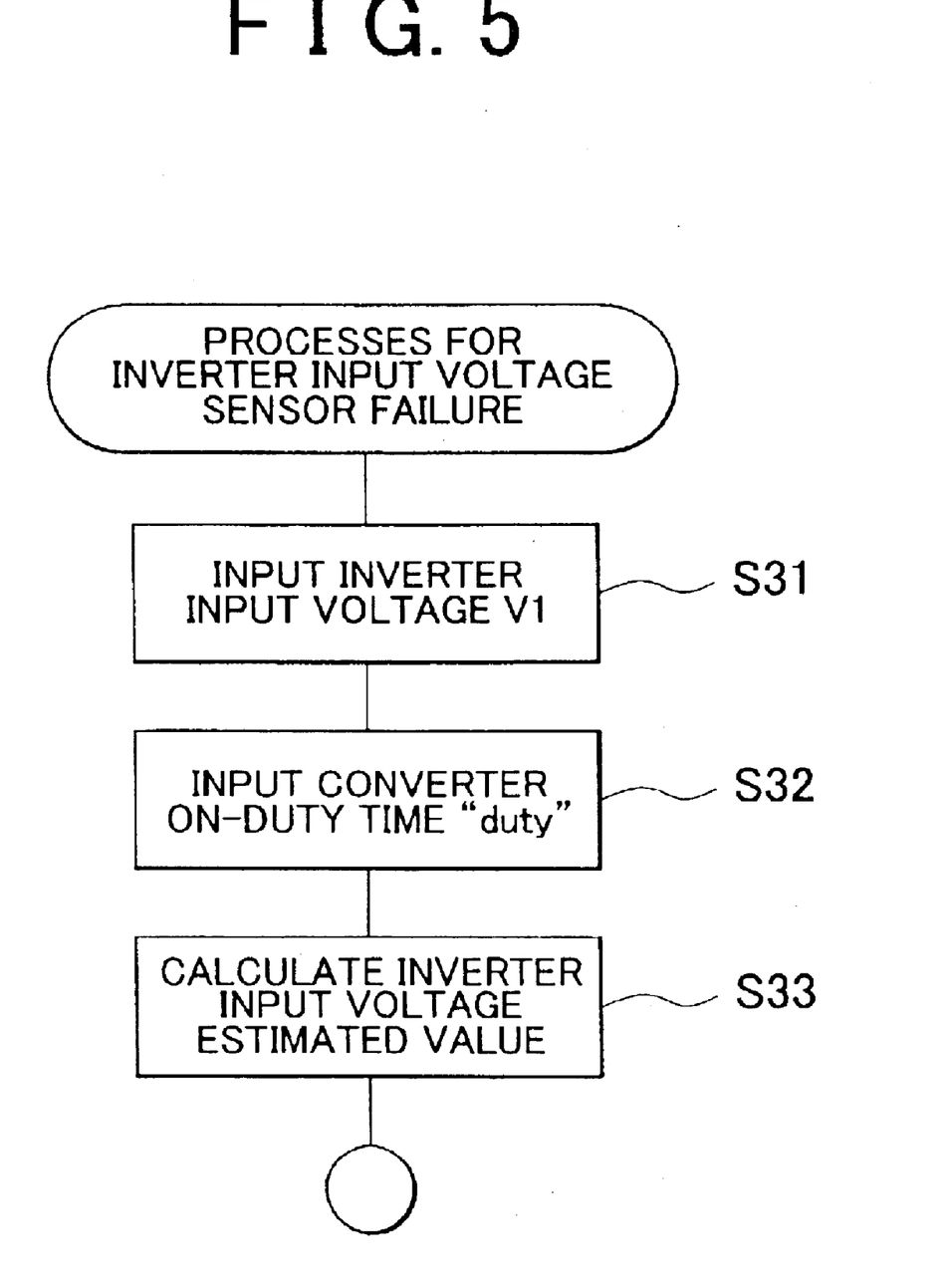
FIG. 5 is a flowchart showing processes to be implemented in the event of a failure of an inverter input voltage sensor.

Next, processes to be implemented in the event of a failure of the inverter input voltage sensor 22 will be described with reference to FIG. 5. First, the control unit 26 reads the battery voltage V1 (step S31) and the duty ratio "duty" in the converter 12 (step S32). Subsequently, the control unit 26 obtains inverter input voltage estimated value V2' by calculating "V2'=V1×duty" (step S33). By using the obtained estimated value V2', the control unit 26 performs the switching control of the converter 12 and the inverter 14 so as to maintain the inverter input voltage V2 to a predetermined value, thus achieving a desired operation of the motor 16.

According to the embodiment, as described above, a failure of each voltage sensor 20 or 22 is detected on the basis of the switching state (duty ratio) in the converter. Thus, the detection of a failure of each voltage sensor is effected without providing two voltage sensors in each location, namely without providing two voltage sensors for detecting the input voltage of the converter and another two voltage sensors for detecting the input voltage of the inverter. Also, when one of the voltage sensors fails, the voltage which would have otherwise been detected by the failed voltage sensor is estimated on the basis of the duty ratio in the converter and the voltage detected by the other voltage sensor operating normally. In the embodiment, accordingly, even if one of the input and output voltages of the converter is not detected, the control is continued by estimating the undetected voltage.

Meanwhile, although it is true that the voltage conversion system constructed as described above is used most effectively for a drive motor of an electric or hybrid motor vehicle, it may preferably be used also for other motors having a large capacity such as a power steering motor.

According to the embodiment of the invention, as described above, a failure of the input or output voltage sensor is detected on the basis of the controlled state of widths of the voltage to be converted in the converter, like the switching state (duty ratio) of the switching elements constituting the converter. Thus, the detection of a failure of each voltage sensor can be effected without providing two voltage sensors in each location.

Also, in the case that one of the input and output voltage sensors fails, the voltage that would have otherwise been detected by the failed voltage sensor is estimated on the basis of the controlled state of widths of the voltage to be converted in the converter (the duty ratio in the converter). Accordingly, even if one of the input and output voltages can not be detected, the control is continued by estimating the undetected voltage.

What is claimed is:

1. A voltage conversion system comprising:
   a converter that converts a voltage;
   a converter control portion that variably controls widths of the voltage to be converted in the converter;
   an input voltage sensor that detects an input voltage of the converter;
   an output voltage sensor that detects an output voltage of the converter; and
   a control unit that determines the presence of an abnormality of the input voltage sensor or the output voltage sensor on the basis of a controlling state in which widths of the voltage to be converted is controlled by the converter control portion.

2. The system according to claim 1, wherein the control unit estimates an input voltage of the converter from a controlled state of widths of the voltage to be converted and the output voltage of the converter detected by the output voltage sensor when the abnormality of the input voltage sensor is determined.

3. The system according to claim 1, wherein the control unit estimates an output voltage of the converter from a controlled state of widths of the voltage to be converted and the input voltage of the converter detected by the input voltage sensor when the abnormality of the output voltage sensor is determined.

4. The system according to claim 1, wherein the converter is constituted of a plurality of switching elements,
   the converter control portion changes widths of the voltage to be converted in the converter by controlling a switching state of the switching elements, and
   the control unit determines the presence of the abnormality of the input voltage sensor or the output voltage sensor on the basis of the switching state of the switching elements.

5. The system according to claim 1, further comprising an inverter being arranged to be supplied with the voltage converted in the converter, wherein an output of the inverter is connected to an alternating current load.

6. The system according to claim 5, wherein the alternating current load is a motor for driving a vehicle.

7. A voltage conversion system comprising:
   a converter that converts a voltage;
   a voltage detection device that detects one of an input voltage and an output voltage of the converter;
   a converter control portion that variably controls widths of the voltage to be converted in the converter; and
   a control unit that estimates one of the input voltage and the output voltage of the converter that has not been detected by the voltage detection device on the basis of a controlling state in which widths of the voltage to be converted is controlled by the converter control portion.

8. The system according to claim 7, wherein the converter is constituted of a plurality of switching elements,
   the converter control portion changes widths of the voltage to be converted in the converter by controlling a switching state of the switching elements, and
   the control unit that determines the presence of an abnormality of the input voltage sensor or the output voltage sensor on the basis of the switching state of the switching elements.

9. The system according to claim 7 further comprising an inverter being arranged to be supplied with the voltage converted in the converter, wherein an output of the inverter is connected to an alternating current load.

10. The system according to claim 8, wherein the alternating current load is a motor for driving a vehicle.

11. A voltage conversion method of a system comprising:
a converter that converts a voltage and is controlled to variably change widths of the voltage to be converted in the converter;
an input voltage sensor that detects an input voltage of the converter;
and an output voltage sensor that detects output voltage of the converter, the voltage conversion method comprising:
determining the presence of an abnormality of the input voltage sensor or the output voltage sensor on the basis of a controlled state of widths of the voltage to be converted in the converter.

12. A voltage conversion method of a system comprising:
a converter that converts a voltage and is controlled to variably change widths of the voltage to be converted in the converter; and
a voltage detection device that detects one of an input voltage and an output voltage of the converter, the voltage conversion method comprising:
estimating one of the input voltage and the output voltage of the converter that has not been detected by the voltage detection device on the basis of (1) a controlled state of widths of the voltage to be converted in the converter and (2) the other of the input voltage and the output voltage of the converter that has been detected by the voltage detection device.

* * * * *